United States Patent
Savir et al.

(10) Patent No.: US 11,080,077 B2
(45) Date of Patent: Aug. 3, 2021

(54) LIFE CYCLE MANAGEMENT FOR CLOUD-BASED APPLICATION EXECUTORS WITH KEY-BASED ACCESS TO OTHER DEVICES

(71) Applicant: EMC IP Holding Company LLC, Hopkinton, MA (US)

(72) Inventors: Amihai Savir, Saansana (IL); Oron Golan, Meitar (IL); Aviram Fireberger, Moshav Mavkiim (IL); Or Herman Saffar, Beer Sheva (IL); Roie Ben Eliyahu, Yerucham (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 172 days.

(21) Appl. No.: 16/170,225

(22) Filed: Oct. 25, 2018

(65) Prior Publication Data
US 2020/0133700 A1   Apr. 30, 2020

(51) Int. Cl.
*G06F 9/455*   (2018.01)
*G06F 9/48*   (2006.01)
(Continued)

(52) U.S. Cl.
CPC .......... *G06F 9/45558* (2013.01); *G06F 9/485* (2013.01); *G06F 21/53* (2013.01); *G06F 21/57* (2013.01); *G06F 21/606* (2013.01); *H04L 9/14* (2013.01); *H04L 63/062* (2013.01); *G06F 2009/45575* (2013.01); *H04L 61/6022* (2013.01)

(58) Field of Classification Search
CPC ...... G06F 9/45558; G06F 9/485; G06F 21/53; G06F 21/606; G06F 21/57; H04L 9/14; H04L 63/062
See application file for complete search history.

(56) References Cited

U.S. PATENT DOCUMENTS 10,523,434 B1 * 12/2019 Sharifi Mehr ...... G06F 21/6218
2015/0086020 A1 * 3/2015 Harjula ..................... H04L 9/30
380/279

(Continued)

OTHER PUBLICATIONS

U.S. Appl. No. 15/797,597 entitled, "Container Life Cycle Management with Honeypot Service", filed Oct. 30, 2017.
(Continued)

*Primary Examiner* — Benjamin C Wu
(74) *Attorney, Agent, or Firm* — Ryan, Mason & Lewis, LLP

(57) ABSTRACT

Life cycle management techniques are provided for cloud-based application executors with key-based access to other devices. An exemplary method comprises determining that a retention time for a first cloud-based application executor (e.g., a virtual machine or a container) has elapsed, wherein the first cloud-based application executor has key-based access to at least one other device using a first key; in response to the determining, performing the following steps: creating a second cloud-based application executor; and determining a second key for the second cloud-based application executor that is different than the first key, wherein the second cloud-based application executor uses the first key to add the second key to one or more trusted keys of the at least one other device and deactivates the first key from the one or more trusted keys.

20 Claims, 11 Drawing Sheets

(51) Int. Cl.
*H04L 9/14* (2006.01)
*H04L 29/06* (2006.01)
*G06F 21/53* (2013.01)
*G06F 21/60* (2013.01)
*G06F 21/57* (2013.01)
*H04L 29/12* (2006.01)

(56) References Cited

U.S. PATENT DOCUMENTS

| | | | | |
|---|---|---|---|---|
| 2016/0088023 | A1* | 3/2016 | Handa | G06F 16/957 726/1 |
| 2017/0195119 | A1* | 7/2017 | Roth | H04L 9/3234 |
| 2018/0332073 | A1* | 11/2018 | Ahmed | G06F 9/4856 |
| 2019/0132299 | A1* | 5/2019 | Tucker | H04L 63/061 |
| 2021/0036851 | A1* | 2/2021 | Villapakkam | H04L 9/321 |

OTHER PUBLICATIONS

U.S. Appl. No. 15/797,609 entitled, "Container Life Cycle Management with Session Dilution Time", filed Oct. 30, 2017.
U.S. Appl. No. 15/797,601 entitled, "Container Life Cycle Management with Retention Rate Adjustment Based on Detected Anomalies", filed Oct. 30, 2017.
U.S. Appl. No. 16/145,529 entitled, "Moving Target Defense with Network Level Changes Providing Substantially Continuous Access to Applications", filed Sep. 28, 2018.
U.S. Appl. No. 15/883,707 entitled, "Monitoring Containers Running on Container Host Devices for Detection of Anomalies in Current Container Behavior", filed Jan. 30, 2018.

\* cited by examiner

LIFE CYCLE MANAGEMENT FOR CLOUD-BASED APPLICATION EXECUTORS WITH KEY-BASED ACCESS TO OTHER DEVICES

CROSS-REFERENCE TO RELATED APPLICATION(S)

The present application is related to U.S. patent application Ser. No. 15/664,719 (now U.S. Pat. No. 10,333,951), entitled "Method and System for Implementing Golden Container Storage," U.S. patent application Ser. No. 15/797,601 (now U.S. Pat. No. 10,951,651), entitled "Container Life Cycle Management With Retention Rate Adjustment Based On Detected Anomalies," and U.S. patent application Ser. No. 16/145,529 (now U.S. Pat. No. 11,005,886), entitled "Moving Target Defense with Network Level Changes Providing Substantially Continuous Access to applications," each incorporated by reference herein in its entirety.

FIELD

The field relates generally to dynamic security techniques for information processing systems.

BACKGROUND

The static nature of many existing computing systems strengthens the susceptibility of the computing systems to malicious attacks and/or unauthorized access. The United States Department of Homeland Security defines Moving Target Defense (MTD) as "the concept of controlling change across multiple system dimensions in order to increase uncertainty and apparent complexity for attackers, reduce their window of opportunity and increase the costs of their probing and attack efforts."

In many organizations, such as an enterprise, there are often applications, such as configuration management tools, that have key-based access to other devices of the organization. A configuration management tool may be used, for example, to configure the servers of an organization. If an attacker can access the configuration management tool, for example, the attacker can then typically obtain access to additional devices within the organization using the keys held by the configuration management tool.

A need remains for MTD techniques that provide a mechanism for updating the keys used by such configuration management tools and other applications with key-based access to other devices.

SUMMARY

In one embodiment, an exemplary method comprises determining that a retention time for a first cloud-based application executor (e.g., a virtual machine or a container) has elapsed, wherein the first cloud-based application executor has key-based access to at least one other device using a first key; in response to the determining, performing the following steps: creating a second cloud-based application executor; and determining a second key for the second cloud-based application executor that is different than the first key, wherein the second cloud-based application executor uses the first key to add the second key to one or more trusted keys of the at least one other device and deactivates the first key from the one or more trusted keys.

In some embodiments, a user communicates with one or more of the first cloud-based application executor and the second cloud-based application executor using a reverse proxy and wherein the reverse proxy sends communications from the user to an active one of the first cloud-based application executor and the second cloud-based application executor.

Other illustrative embodiments include, without limitation, apparatus, systems, methods and computer program products comprising processor-readable storage media.

DETAILED DESCRIPTION

Figure 1:
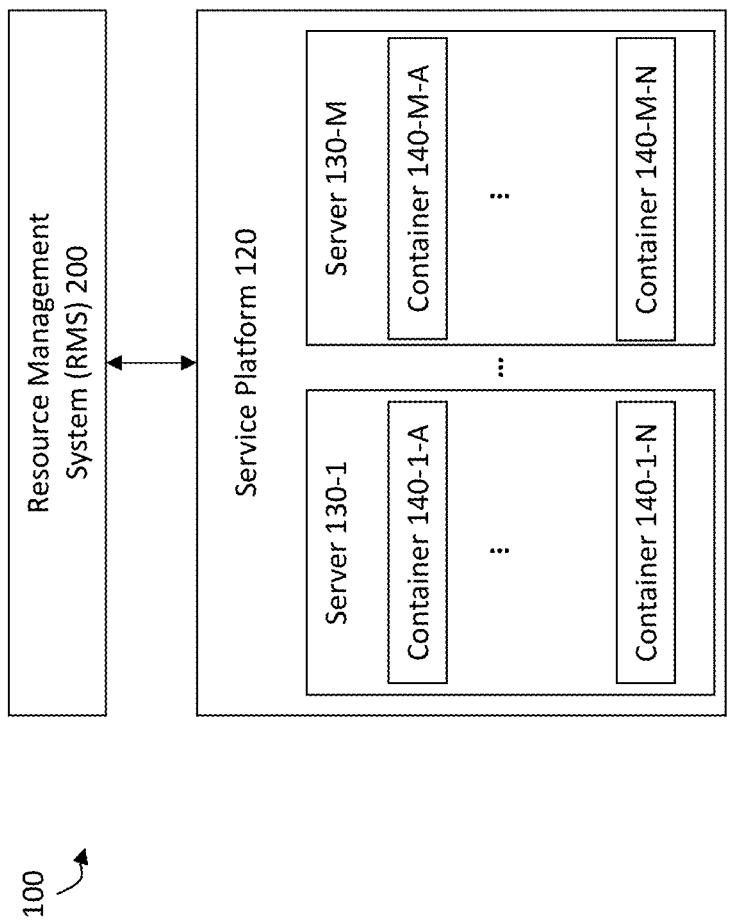
FIG. 1 illustrates an exemplary system, according to one or more embodiments of the disclosure.

Illustrative embodiments of the present disclosure will be described herein with reference to exemplary communication, storage and processing devices. It is to be appreciated, however, that the disclosure is not restricted to use with the particular illustrative configurations shown. Aspects of the disclosure provide methods, apparatus and computer program products for life cycle management for cloud-based application executors with key-based access to other devices.

In one or more embodiments, techniques are provided for implementing MTD computer security techniques using a key update mechanism for applications with key-based access to other devices. Specifically, one or more exemplary embodiments of the disclosure entail the creation of a container registry to securely store golden containers (or templates) for containers of specific application types that execute within a service platform. The containers are cycled out based on predefined retention rules, policies and time thresholds. Each recreated container is modeled after one of the golden containers, and assigned new Internet Protocol (IP) and/or media access control (MAC) addresses rather than assuming the existing addresses of the containers that the recreated containers are replacing. Substantively, embodiments of the disclosure employ these tactics towards implementing an MTD strategy.

In one or more embodiments, techniques are provided for protecting cloud-based application executors, such as containers and/or virtual machines, that have key-based access to other devices. One or more aspects of the disclosure recognize that such applications with key-based access to other devices are often critical for an organization because if an attacker accesses the application (such as a configuration management tool), the attacker can then typically obtain access to additional devices within the organization using the keys held by the application.

Thus, in some embodiments, when replacing a current container with a new container, for example, the keys used by the current container for key-based access to other devices are replaced as well (and the old keys are deactivated). Otherwise, an attacker that had access to the current container before the replacement could use the key(s) stored by the current container (and obtained by the attacker) to attack one or more of the other devices, such as one or more of the servers of an organization.

Generally, a cloud-based application executor, as used herein, comprises a container, a virtual machine or another virtualized processing entity that executes a first application that simulates a machine and that executes one or more additional applications. Thus, the cloud-based application executor comprises at least one application that the cloud-based application executor runs, as well as an application that implements the cloud-based application executor itself.

As noted above, some applications, such as configuration management tools, have key-based access to other devices of an organization. Generally, a configuration management tool may be used, for example, to configure the servers of an organization. The SaltStack™ configuration management tool from SaltStack, Inc. of Lehi, Utah, and the Ansible™ configuration management tool from Red Hat, Inc. of Durham, N.C., are examples of commercially available configuration management tools.

While one or more embodiments of the present disclosure are illustrated in the context of such configuration management tools, the present disclosure also applied to other applications with key-based access to other devices, such as software provisioning tools and application deployment tools, as would be apparent to a person of ordinary skill in the art.

Infrastructure management tools, such as Puppet™ and Chef™ infrastructure management tools, for example, involve many operational components, such as data, processes, networks, operating platforms, equipment and devices. Configuration management encompasses the practices and tooling to automate the delivery and operation of infrastructure. Configuration management tools model infrastructure, monitor and enforce configurations, and remediate unexpected changes or configuration changes, in a known manner.

In various implementations, MTD strategies can be implemented in different levels. For example, on a system level, a compiler can be used to generate multiple functionally equivalent, but internally different variants of a program. On an application level, an execution environment, for example, can check and verify the random key. Finally, on a network level, a Dynamic Resource Mapping System, for example, can randomly change the location of important resources of the system. In one or more embodiments, the present disclosure is implemented on a network level (using a representative Dynamic Resource Mapping System).

FIG. 1 illustrates an exemplary system 100, according to one or more embodiments of the disclosure. The system 100 includes a resource management system (RMS) 200, as discussed further below in conjunction with FIG. 2, operatively connected to a service platform 120. In one embodiment of the disclosure, the RMS 200 and the service platform 120 may be directly or indirectly connected to one another through a network (e.g., a local area network (LAN), a wide area network (WAN) such as the Internet, a mobile network, or any other type of network). In embodiments where the RMS 200 and the service platform 120 are indirectly connected, there may be other networking components or systems (e.g., switches, routers, gateways, etc.) (not shown) that facilitate communication and/or information exchange. Further, the RMS 200 and the service platform 120 may communicate with one another using any combination of wired and/or wireless communication connections and/or protocols.

In at least one embodiment of the disclosure, the RMS 200 may be a platform for the centralized management and deployment of containers in the service platform 120. The RMS 200 may be implemented on a physical server (e.g., in a data center) or on a virtual server that may be cloud-based. Further, the RMS 200 may be implemented on a single server, or alternatively, on multiple servers that may be physical, virtual, or a combination thereof. In one embodiment of the disclosure, the RMS 200 may be implemented on one or more computing systems similar to the exemplary computing systems shown in FIGS. 9 and 10.

In one embodiment of the disclosure, the service platform 120 may be a hardware and/or software implemented environment for the deployment of services and resources. The service platform 120 may be implemented on one or more servers 130-1 through 130-M. Each server 130 may be a physical server or a virtual server that may be cloud-based. In one embodiment of the disclosure, each server 130 may be a computing system similar to the exemplary computing system discussed further below in conjunction with FIG. 10. Further, each server 130 may be any computing system that may be programmed to receive requests, process requests, and based on the processing of requests, extend services and/or resources to client computing systems (not shown). Examples of types of servers include, but are not limited to, virtualized servers, database servers, application servers, print servers, and mail servers.

In one embodiment of the disclosure, each server 130 may be further programmed to provide computing resources to support the implementation and functionalities of a set of containers 140-1-A through 140-M-N. A container 140 may be an isolated, lightweight virtualization mechanism (or software construct) that allows for the running of an application or an operating system within the container 140 without the overhead of executing a hypervisor (as is needed for executing virtual machines on underlying hardware). Minimal overhead may be generated by containers 140 because: (i) containers 140 share the same operating system kernel with other containers 140 and the underlying host (e.g., a server 130); and (ii) containers 140 (unlike virtual machines) do not need to emulate physical hardware. Further, in one embodiment of the disclosure, a container 140 may be implemented virtually by a host operating system.

In one embodiment of the disclosure, the set of containers 140-1-A through 140-M-N may be segmented into one or more pods (not shown). Specifically, each pod may include a subset (ss) of the set of containers 140-1-A through 140-M-N. In one embodiment of the disclosure, the aforementioned subset of containers 140-$ss$ may be co-located in the same server (e.g., 130-1). In another embodiment of the disclosure, the aforementioned subset of containers 140-*ss* may be executing on multiple servers 130-1 through 130-M of the service platform 120. Furthermore, the subset of containers 140-*ss* in each pod may work together towards implementing a service. Subsequently, each container 140 in a pod may be assigned an application type, and thus, include functionalities conforming to their assigned application type. The application type that may be assigned to a container 140 may include, but is not limited to, a front-end application type, a back-end application type, and a database application type.

In one embodiment of the disclosure, a front-end (fe) application type container 140-*fe* may be representative of server computing resources dedicated towards facilitating the interaction between a service and a user, or a service and another service. Specifically, a front-end application type container 140-*fe* may include functionality to: (i) provide a specification for how the interaction and/or exchange of information should take place between the service and a user or other service; (ii) receive input (i.e., data, requests, etc.), conforming to the aforementioned specification, from a user or other service; and (iii) provide output (i.e., processed data, responses, resources, etc.), conforming to the aforementioned specification, to a user or other service. By way of example, a front-end application type container 140-*fe* may implement at least a portion of a command line interface (CLI), a graphical user interface (GUI), an application program interface (API), a web-based user interface (WUI), a natural language interface, or any combination thereof.

In one embodiment of the disclosure, a back-end (be) application type container 140-*be* may be representative of server computing resources dedicated towards implementing the functional logic and operations supporting a service. Specifically, a back-end application type container 140-*be* may include functionality to: (i) validate received input from a user or other service; (ii) maintain service-wide security operations; (iii) communicate with external hosts to retrieve additional information; and (iv) process (i.e., execute algorithms on) the received input and additional information, if any, to generate output. By way of example, a back-end application type container 140-*be* may implement at least a portion of a data processing algorithm, a validation rule, an internet security suite, a web-service (i.e., technology that allows services/applications to communicate with each other), etc.

In at least one embodiment, a database (db) application type container 140-*db* may be representative of server computer resources dedicated towards the management of information. Specifically, a database application type container 140-*db* may include functionality to: (i) track and administer information generated, stored, and/or used by the service; (ii) maintain a schema (i.e. logical structure) for the information; (iii) monitor information storage and retrieval performance; and (iv) encode information through the application of, for example, encryption, compression, deduplication, and other data transforming operations. By way of example, a database application type container 140-*db* may implement at least a portion of database management system (DBMS), an encryption, compression, deduplication, etc., algorithm, a query-response system (QRS), etc.

While containers throughout the disclosure may host applications, and thus, may be associated with application types, as described above, one of ordinary skill in the art will appreciate that containers can host other constructs without departing from the scope of the disclosure. For example, in one embodiment of the disclosure, a container 140 may alternatively host a micro-service, which may structure an application as a collection of coupled services. In another embodiment of the disclosure, a container 140 may alternatively host a web server, and thereby include functionality to store, process, and/or deliver web resources to one or more clients (not shown). In yet another embodiment of the disclosure, a container 140 may alternatively host a monitoring tool for the surveilling of, for example, web resources, servers, networks, and/or application performance and reliability.

Further, while one or more embodiments are illustrated herein in the context of containerized applications, aspects of the present invention may also be applied to virtualized applications executed using one or more virtual machines, as would be apparent to a person of ordinary skill in the art.

Figure 2:
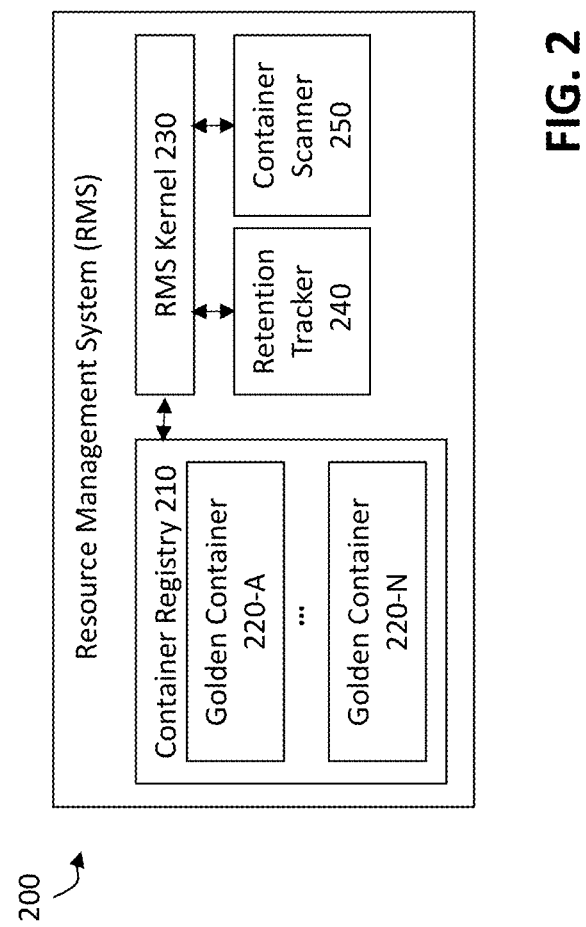
FIG. 2 illustrates the resource management system of FIG. 1, in further detail, according to an embodiment of the disclosure.

FIG. 2 illustrates the resource management system 200 of FIG. 1, in further detail, according to an embodiment of the disclosure. The RMS 200 includes an RMS kernel 230 operatively connected to a container registry 210, a retention tracker 240, and a container scanner 250. Each of these components is described below.

In one embodiment of the disclosure, the RMS kernel 230 may be a core application or computer program (e.g., an operating system) executing on the underlying hardware (e.g., one or more integrated circuits) of the RMS 200. The RMS kernel 230 may include functionality to: (i) generate, store, and retrieve golden containers (described below); (ii) create containers based on a golden container of the same application type; (iii) delete or reassign containers as honeypots; (iv) generate and feed emulated network traffic to honeypot containers; (v) submit scan requests to, and receive scan responses from, the container scanner 250; and (vi) submit track requests to, and receive elapse notifications from, the retention tracker 240. One of ordinary skill in the art will appreciate that the RMS kernel 230 may include other functionalities without departing from the scope of the disclosure.

In one embodiment of the disclosure, the container registry 210 may be a secure repository for storing one or more golden containers 220-A through 220-N. The container registry 210 may be segmented into one or more logical partitions (not shown), whereby each logical partition may be reserved to store golden containers 220-A through 220-N for a particular service implemented on the service platform. The container registry 210 may be implemented using any type of storage unit and/or device (e.g., a file system, a database, a collection of tables, or any other storage mechanism). Further, the container registry 210 may be implemented using multiple storage units and/or devices, which may or may not be of the same type or located at the same physical site. In one embodiment of the disclosure, the container registry 210 may be implemented using persistent (i.e., non-volatile) storage media such as, for example, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other memory defined as a non-volatile Storage Class Memory (SCM).

In one embodiment of the disclosure, a golden container 220 may be a template for all containers of a specific application type that implement at least a portion of a service deployed through the service platform. Specifically, a golden container 220 may be a version (i.e., snapshot at a given time) of a cloned container belonging to a specific application type and used in the implementation of a service. Further, a golden container 220 may be used as a template for the generation of new containers of that specific application type towards implementing at least a portion of the service. As mentioned above, a container (and subsequently, a golden container 220) may be associated with a front-end application type, a back-end application type, or a database application type. In one embodiment of the disclosure, a golden container 220 may include all the libraries, tools, and software needed to support the functionalities and/or responsibilities of a container assigned to their specific application type and towards implementing at least their portion of a service. Further, in one embodiment of the disclosure, a golden container 220 may also be referred to as a golden image or a master image/container.

In one embodiment of the disclosure, the retention tracker 240 may be a computer process (or an instance of a computer program) executing on the RMS 200. Specifically, the retention tracker 240 may be a computer process dedicated towards the management of container retention times. A container retention time may refer to a duration of time (e.g., minutes, hours, etc.) specifying the lifespan of a container executing on the service platform. In one embodiment of the disclosure, the retention tracker 240 may include functionality to: (i) receive track requests from the RMS kernel 230; (ii) in response to receiving track requests, initialize and track the retention time for one or more containers actively executing on the service platform; and (iii) when a retention time for a container elapses, plus any predefined session dilution time, generate and transmit an elapse notification to the RMS kernel 230.

In one embodiment of the disclosure, the container scanner 250 may be a computer process (or an instance of a computer program) executing on the RMS 200. Specifically, the container scanner 250 may be a computer process dedicated towards the validation of containers. Validation of a container may refer to determining whether the container includes computer readable program code consistent with malicious activity, and/or whether the container exhibits anomalous behavior. Thus, in one embodiment of the disclosure, the container scanner 250 may include functionality to: (i) maintain and update a library of digital signatures (e.g., patterns of data) unique to one or more known cyber threats and/or attacks; (ii) generate models of the intended behavior (e.g., normal operation) of one or more containers executing on the service platform; (iii) receive scan requests from the RMS kernel 230 specifying container IDs; (iv) in response to receiving scan requests, subject containers to one or more misuse and/or anomaly detection algorithms; (v) based on a matching of at least one known digital signature to at least a portion of a container, determine that the container is contaminated; (vi) based on at least one deviation from a model exhibited by an active container, determine that the container is contaminated; (vii) based on not one match to a known digital signature to at least a portion of a container and based on observing no deviations in behavior exhibited by a container with respect to a model of the container, determine that the container is clean; and (viii) generate and provide scan responses, to the RMS kernel 230, including the results of the validation process (e.g., that a container is clean, or alternatively, that a container is contaminated).

For a further discussion of golden containers 200 and container registries 210, see, for example, U.S. patent application Ser. No. 15/664,719 (now U.S. Pat. No. 10,333,951), filed Jul. 31, 2017, entitled "Method and System for Implementing Golden Container Storage," incorporated by reference herein in its entirety.

It is noted that container registry 210 may be implemented, at least in part, using the Docker hub container registry, from Docker, Inc. In one or more embodiments, a Kubernetes Container Orchestration Engine (COE) (see, e.g., https://kubernetes.io/) may be employed to automate deployment, scaling, and management of the containerized applications.

Figure 3:
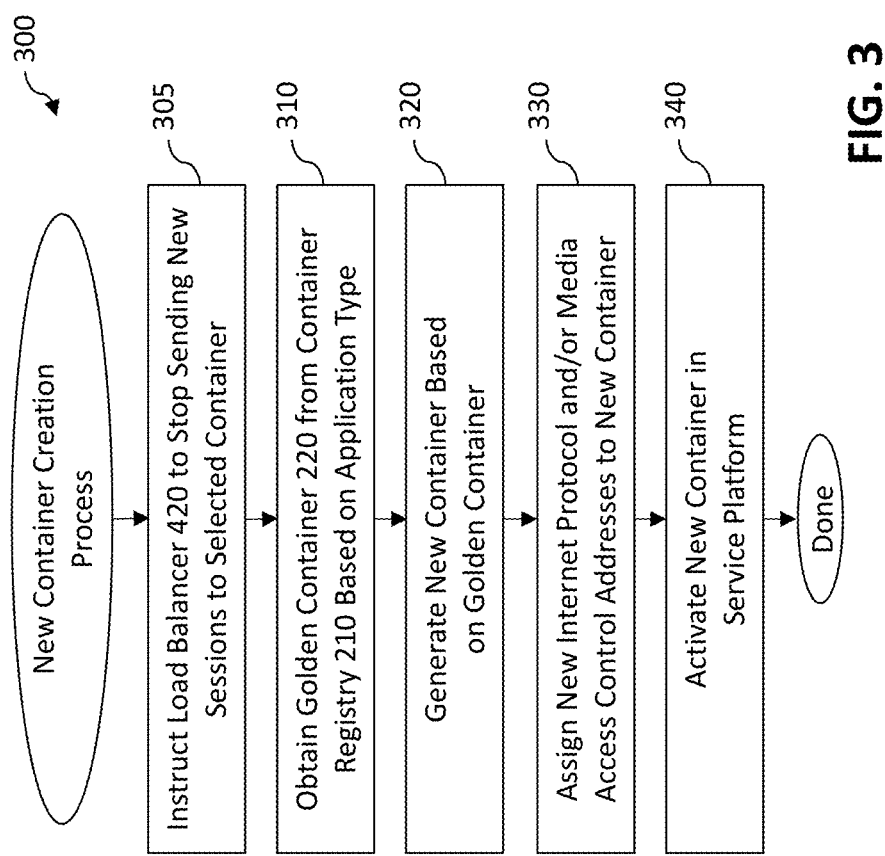
FIG. 3 is a flow chart illustrating an exemplary implementation of a new container creation process, according to one embodiment of the disclosure.

FIG. 3 is a flow chart illustrating an exemplary implementation of a new container creation process 300, according to one embodiment of the disclosure. As shown in FIG. 3, the exemplary new container creation process 300 initially instructs the load balancer 420 (FIG. 4) to stop sending new sessions to the selected container during step 305. In one or more embodiments, the retention tracker 240 issues an elapse notification during step 305 to the RMS kernel 230. The elapse notification may include, for example, a container identifier that uniquely identifies the container 140 associated with the elapsed retention time (e.g., the old container). Thereafter, in response to receiving the elapse notification, the RMS kernel 230 obtains a golden container 220 from the container registry 210 during step 310, e.g., based on the application type.

Thus, in an embodiment of the disclosure, the golden container 220 obtained from the container registry 210 may be of the same application type as the old container (e.g., selected container 140). More specifically, the obtained golden container 220 may be retrieved from a logical partition reserved for the specific service that the old container is or has been, at least in part, implementing.

During step 320, the RMS kernel 230 generates a new container, based on the obtained golden container 220. In one embodiment of the disclosure, the RMS kernel 230 may generate the new container 140 based on the template outlined by the golden container 220 (obtained in step 310). The new container may be generated as a substitute for the old container, whose predefined retention time had elapsed through a determination performed in step 320, and accordingly, may be associated with the same application type as the old container and the golden container.

During step 330, the RMS kernel 230 assigns an Internet Protocol (IP) address to the new container (generated in step 320). In one embodiment of the disclosure, a new IP address is assigned rather than transferring the existing IP address associated with the old container to the new container. In one embodiment of the disclosure, a new IP address may be assigned to the new container as an MTD measure (described above). In another embodiment of the disclosure, the RMS kernel 230 may further assign a media access control (MAC) address to the new container. The MAC address may be a new MAC address rather than the existing MAC address associated with the old container. Similarly, the new MAC address may be assigned to the new container as another MTD measure.

The new container is then activated in the service platform 120 during step 340. For example, the RMS kernel 230 can connect the new container into the service platform 120. Specifically, in one embodiment of the disclosure, the new container may be directed to a pod on the service platform 120 that implements the service that the old container may be, at least in part, implementing. At this point, the new container replaces the old container, thereby assuming one or more functionalities of the service, which may have been implemented by the old container.

After connecting the new container during step 340, the RMS kernel 230 disconnects the old container from the service platform 120. Specifically, in one embodiment of the disclosure, the old container may be deleted, leading to the deallocation of server computing resources expended towards implementing the old container.

Figure 4:
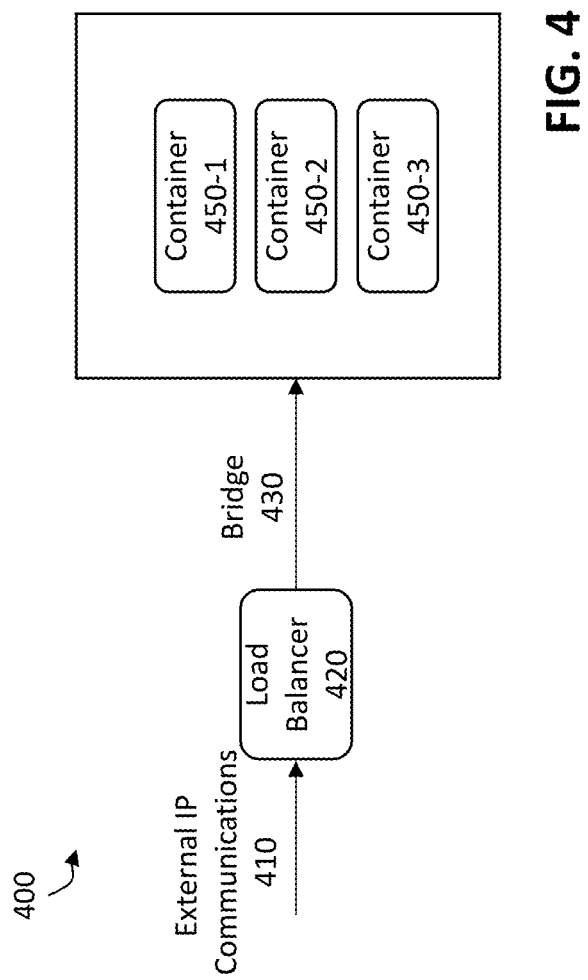
FIG. 4 illustrates an exemplary container environment, according to some embodiments of the disclosure.

FIG. 4 illustrates an exemplary container environment 400, according to some embodiments of the disclosure. In the exemplary embodiment of FIG. 4, a web service is deployed to three containers 450-1 through 450-3. The containers 450-1 through 450-3 each have a unique IP address, and provide a service to a load balancer 420. It is typically desirable to load balance between the containers 450-1 through 450-3, for example, using a proxy or a load balancer.

In the example of FIG. 4, load balancer 420 receives external IP communications 410 for the service and load balances the traffic for the service among containers 450-1 through 450-3, using a bridge 430. It noted that only front-end application type containers 140-*fe* are expected to have external IP communications 410.

In one or more embodiments, the load balancer 420 may be implemented, for example, as a Google load balancer or a Microsoft Azure load balancer.

Figure 5:
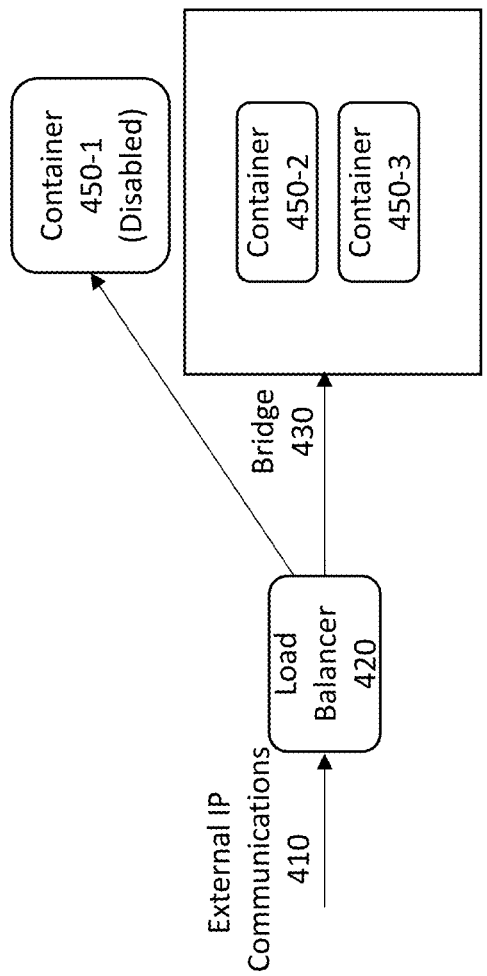
FIG. 5 illustrates a disabling stage in the life cycle of a container according to an embodiment of the disclosure.

FIG. 5 illustrates container 450-1 of FIG. 4, during the predefined session dilution time of the container 450-1, according to an embodiment of the disclosure. As noted above, the session dilution time has been selected to allow existing sessions to finish before the container 450-1 is disconnected from the service platform 120. Thus, as shown in FIG. 5, the load balancer 420 sets the container 450-1 to a disabled status, such that the existing sessions will be processed, but the load balancer 420 will not send any new sessions to the disabled container 450-1.

Thus, when load balancer 420 receives new external IP communications 410 for the service the load balancer 420 will load balance the new session traffic for the service only among containers 450-2 and 450-3, using bridge 430, until a new container is activated to replace the disabled container 450-1.

Figure 6A:
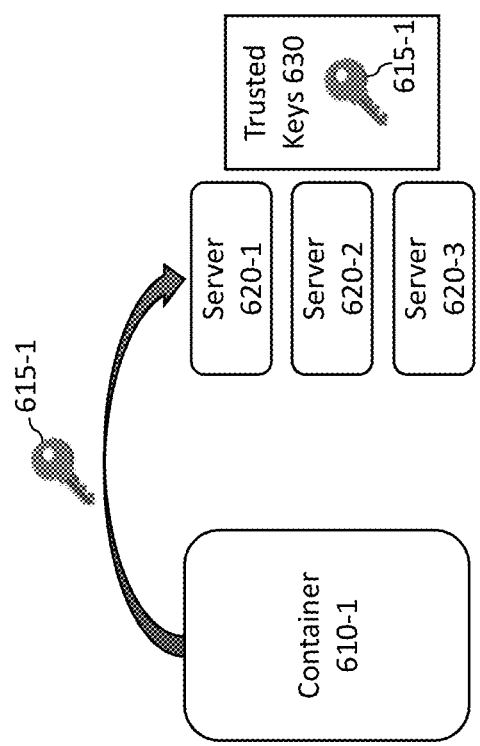
FIG. 6A illustrates a container having key-based access to other devices, according to one embodiment.

FIG. 6A illustrates a container 610-1 having key-based access to other devices, according to one embodiment. As shown in FIG. 6A, the exemplary container 610-1 has key-based access to one or more servers 620-1 through 620-3 using a first key 615-1. Generally, the servers 620-1 through 620-3 allow access using a set of trusted keys 630, which includes the first key 615-1, in a known manner. The container 610-1 may be implemented, for example, as a configuration management tool, that performs configuration tasks and/or implements automation on one or more of the servers 620-1 through 620-3, or other devices of an organization.

Figure 6B:
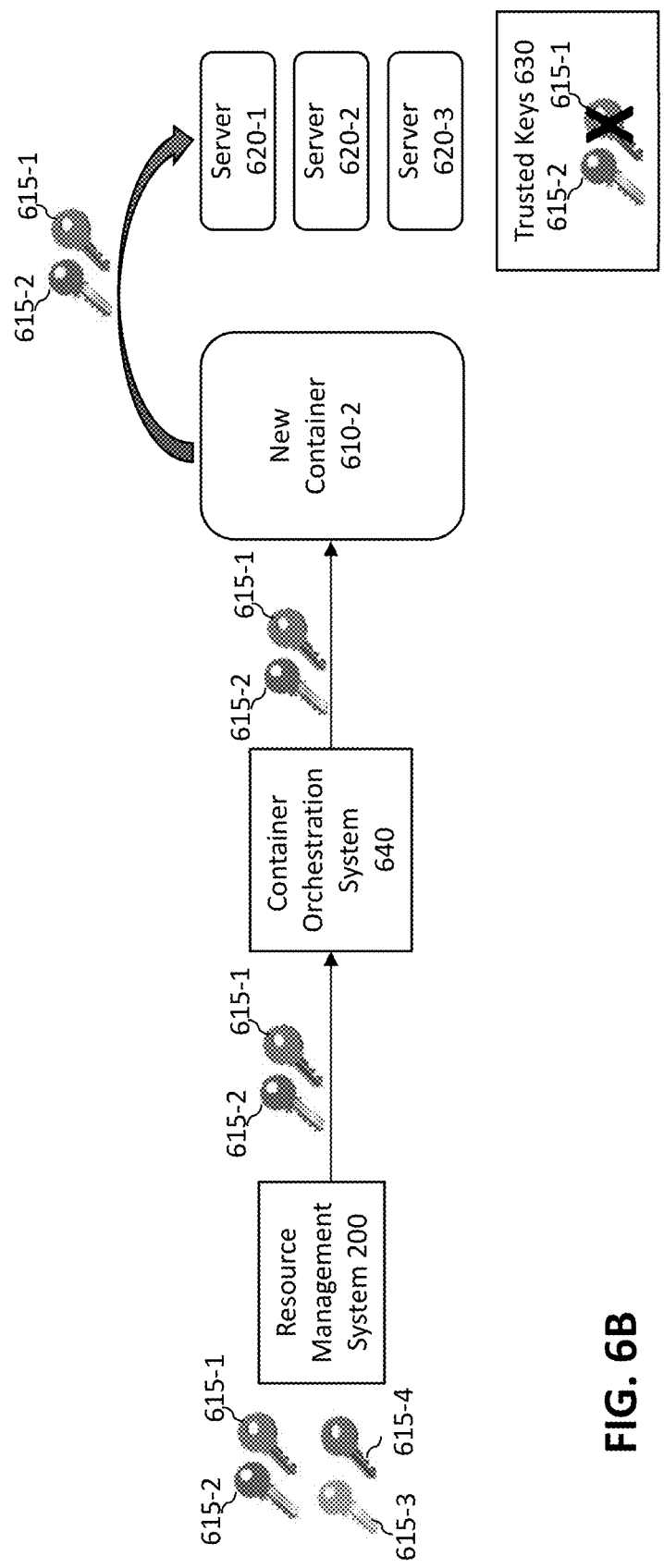
FIG. 6B illustrates a replacement of the container of FIG. 6A using MTD techniques with a key update mechanism, according to some embodiments.

FIG. 6B illustrates a replacement of the container 610-1 of FIG. 6A with a new container 610-2, for example, upon an expiration of a retention time applicable to the container 610-1, using MTD techniques with a key update mechanism, according to some embodiments. As shown in FIG. 6B, the exemplary resource management system 200 of FIG. 2 creates a new container 610-2. In some embodiments, the resource management system 200 maintains a set of keys 615 used by one or more managed containers.

In the example of FIG. 6B, the resource management system 200 provides key 615-1 used by the container 610-1 of FIG. 6 to gain key-based access to one or more of the servers 620-1 through 620-3 to the new container 610-2, as well as a new key 615-2 for the new container 610-2 to obtain such key-based access to the other devices. In the exemplary embodiment, the keys 615-1 and 615-2 are provided to the new container 610-2 using a trusted container orchestration system 640 (e.g., a hypervisor), such as a Kubernetes Container Orchestration Engine. The old key 615-1 and/or the new key 615-2 may be, for example, SSH (Secure Socket Shell) keys.

In this manner, when replacing the current container 610-1 with a new container 610-2, the key 615-1 used by the current container 610-1 for key-based access to other devices is replaced as well. Otherwise, an attacker that had access to the current container 610-1, can use the key(s) (e.g., 615-1) stored in the current container 610-1 to attack one or more of the other devices, such as one or more of the servers 620-1 through 620-3.

In some embodiments, the new container 610-2 uses the key 615-1 used by the current container 610-1 for key-based access to other devices to add the new key 615-2 used by the new container 610-2 (for key-based access to other devices) to the list of trusted keys 630 on all of the servers 620. In addition, the new container 610-2 then deletes (or otherwise deactivates) the old key 615-1 from the list of trusted keys 630. Thereafter, only the new container 610-2 can use the new key 615-2 used by the new container 610-2 to obtain key-based access to other devices. Attempts to obtain key-based access to one or more of the servers 620 using the old key 615-1 will fail. In other words, the old container 610-1 and any attacker having the old key 615-1 will be denied access to the servers 620.

Figure 7:
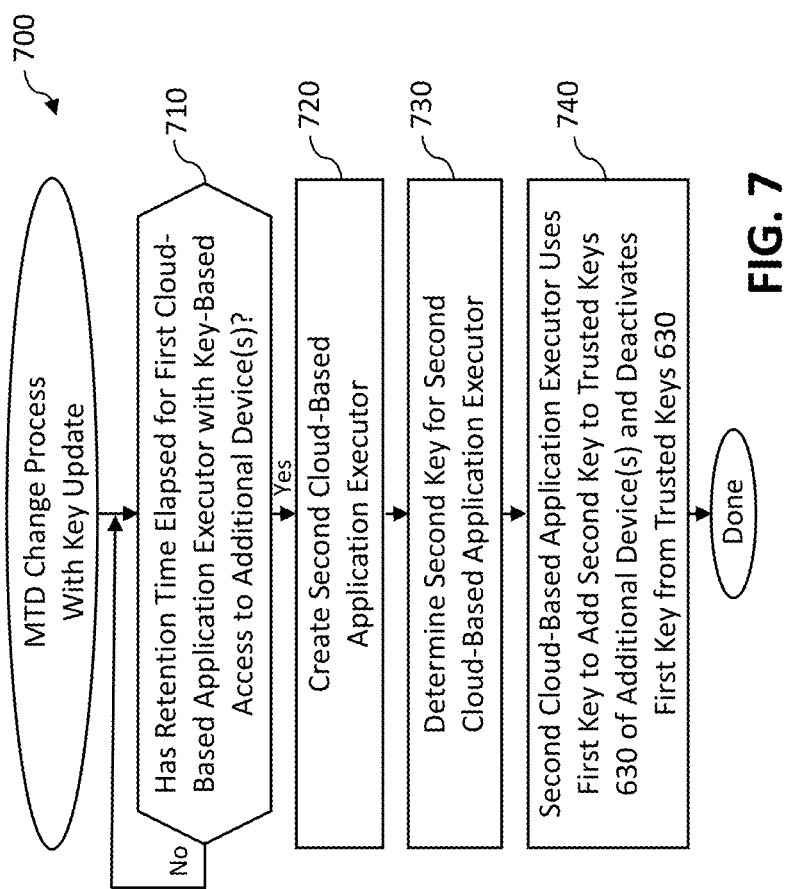
FIG. 7 is a flow chart illustrating an exemplary implementation of an MTD change process with a key update mechanism, according to one embodiment of the disclosure.

FIG. 7 is a flow chart illustrating an exemplary implementation of an MTD change process 700 with a key update mechanism for applications having key-based access to additional devices, according to one embodiment of the disclosure. As shown in FIG. 7, the exemplary MTD change process 700 initially determines whether a retention time for a first cloud-based application executor has elapsed during step 710. The first cloud-based application executor has key-based access to at least one additional device using a first key.

Once the retention time for the first cloud-based application executor has elapsed, the exemplary MTD change process 700 creates a second cloud-based application executor during step 720 and determines a second key for the second cloud-based application executor that is different than the first key during step 730.

The second cloud-based application executor uses the first key during step 740 to add the second key to one or more trusted keys 630 of the at least one additional device and then deactivates the first key from the one or more trusted keys 630.

Figure 8:
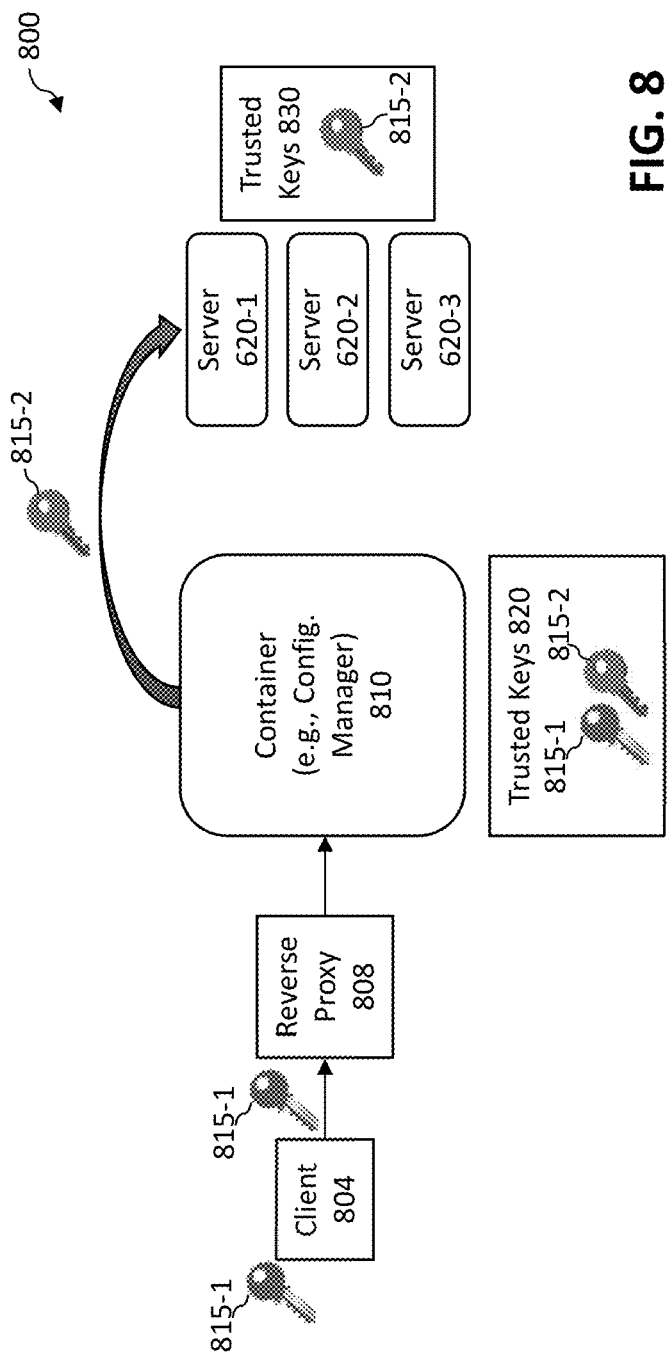
FIG. 8 illustrates an exemplary client communicating with a current valid container for a given application using a reverse proxy, according to an embodiment.

FIG. 8 illustrates an exemplary client 804 communicating with a current valid container 810 for a given application using a reverse proxy 808, according to an embodiment. As shown in FIG. 8, the exemplary client 804 provides a first authentication key 815-1 to the reverse proxy 808 and the reverse proxy 808 in turn provides the first authentication key 815-1 to the current valid container 810 (e.g., a configuration manager) for the given application. The current valid container 810 accesses a list of trusted keys 820 to authenticate the client 804 and to obtain the key 815-2 used for key-based access to one or more of the servers 620-1 through 620-3. In this manner, the user (e.g., exemplary client 804) can transparently access the desired server 620, using the reverse proxy 808, without knowing which container 810 is currently valid for the exemplary configuration manager. In some embodiments, the resource management system 200 of FIG. 2 will reconfigure the reverse proxy 808 to send the user commands to the active version of container 810.

One or more embodiments of the disclosure provide methods and apparatus for managing MTD changes using a key update mechanism. In one or more embodiments, techniques are provided for implementing MTD computer security techniques using a key update mechanism for applications with key-based access to other devices.

The foregoing applications and associated embodiments should be considered as illustrative only, and numerous other embodiments can be configured using the techniques disclosed herein, in a wide variety of different applications.

It should also be understood that the disclosed techniques for managing MTD changes using a key update mechanism, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for managing MTD changes using a key update mechanism may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a container life cycle management system 100, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of an MTD change platform for applications with key-based access to other devices in illustrative embodiments. The cloud-based systems can include object stores such as Amazon S3, GCP Cloud Storage, and Microsoft Azure Blob Storage.

As noted above, the container registry 210 may be implemented, at least in part, using the Docker hub container registry, from Docker, Inc.; and in one or more embodiments, the Kubernetes Container Orchestration Engine (COE) (see, e.g., https://kubernetes.io/) may be employed to automate deployment, scaling, and management of the containerized applications.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the MTD change devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. These platforms may also be used to implement at least portions of other information processing systems in other embodiments.

Figure 9:
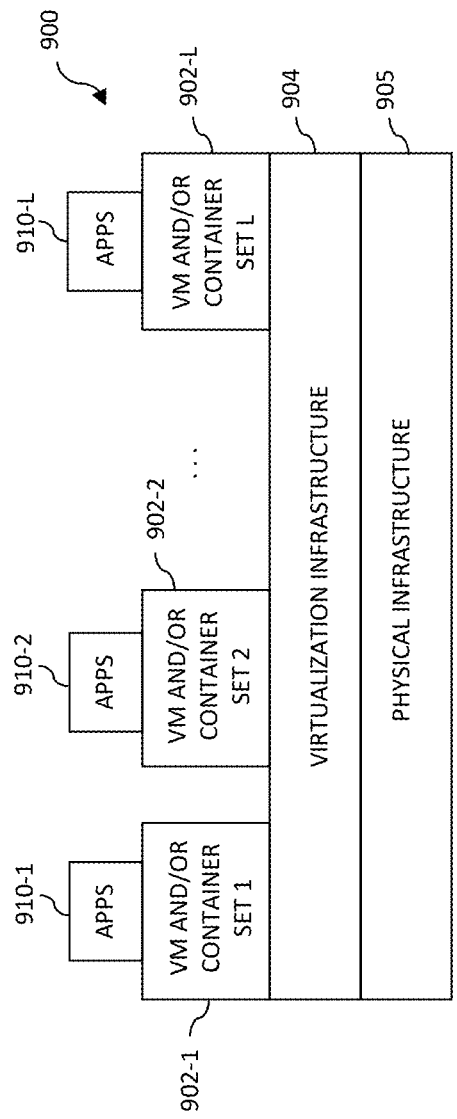
FIG. 9 illustrates an exemplary processing platform that may be used to implement at least a portion of one or more embodiments of the disclosure comprising a cloud infrastructure.

FIG. 9 shows an example processing platform comprising cloud infrastructure 900. The cloud infrastructure 900 comprises a combination of physical and virtual processing resources that may be utilized to implement at least a portion of the container life cycle management system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. Such implementations can provide MTD change functionality for applications with key-based access to other devices of the type described above for one or more processes running on a given one of the VMs. For example, each of the VMs can implement MTD change control logic for one or more processes running on that particular VM.

An example of a hypervisor platform that may be used to implement a hypervisor within the virtualization infrastructure 904 is the VMware® vSphere® which may have an associated virtual infrastructure management system such as the VMware® vCenter™. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system. Such implementations can provide MTD change functionality for applications with key-based access to other devices of the type described above for one or more processes running on different ones of the containers. For example, a container host device supporting multiple containers of one or more container sets can implement one or more instances of MTD change control logic and associated key update functionality for use in making MTD changes for applications with key-based access to other devices.

As is apparent from the above, one or more of the processing modules or other components of container life cycle management system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform.

Figure 10:
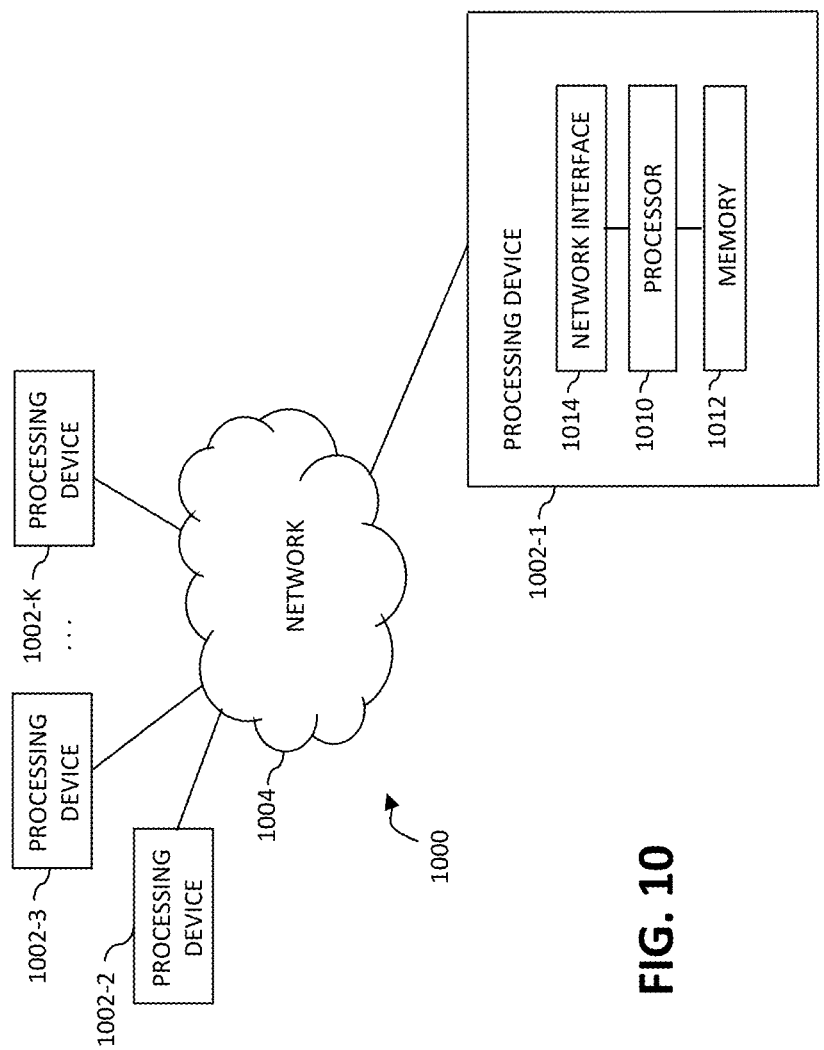
FIG. 10 illustrates another exemplary processing platform that may be used to implement at least a portion of one or more embodiments of the disclosure.

Another example of a processing platform is processing platform 1000 shown in FIG. 10. The processing platform 1000 in this embodiment comprises at least a portion of the given system and includes a plurality of processing devices, denoted 1002-1, 1002-2, 1002-3, . . . 1002-K, which communicate with one another over a network 1004. The network 1004 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1002-1 in the processing platform 1000 comprises a processor 1010 coupled to a memory 1012. The processor 1010 may comprise a microprocessor, a microcontroller, an application specific integrated circuit (ASIC), a field programmable gate array (FPGA) or other type of processing circuitry, as well as portions or combinations of such circuitry elements, and the memory 1012, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and the given system may include additional or alternative processing platforms, as well as numerous distinct processing platforms in any combination, with each such platform comprising one or more computers, storage devices or other processing devices.

Multiple elements of container life cycle management system 100 or portions thereof may be collectively implemented on a common processing platform of the types shown in FIGS. 9 and 10, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of the flow charts and/or pseudo code shown in FIGS. 3 and 7 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and compute services platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
  determining that a retention time for a first cloud-based application executor has elapsed, wherein the first cloud-based application executor has key-based access to at least one other device using a first key;
  in response to the determining, performing the following steps, using at least one processing device:
    creating a second cloud-based application executor, wherein the first cloud-based application executor, the second cloud-based application executor and the at least one other device are distinct from one another; and determining a second key for the second cloud-based application executor that is different than the first key, wherein the second cloud-based application executor provides the first key with the second key to add the second key to one or more trusted keys of the at least one other device such that the second cloud-based application executor has key-based access to the at least one other device using the second key, wherein the first key is deactivated from the one or more trusted keys and wherein the method is performed by at least one processing device comprising a processor coupled to a memory.

2. The method of claim 1, wherein the first cloud-based application executor comprises a configuration manager that uses the first key to control the at least one other device.

3. The method of claim 1, wherein the first cloud-based application executor is associated with a first Internet Protocol (IP) address and a first media access control (MAC) address, and wherein the second cloud-based application executor is associated with at least one of a different IP address and a different MAC address.

4. The method of claim 1, wherein the first cloud-based application executor and the second cloud-based application executor are associated with a same application type.

5. The method of claim 1, further comprising the step of suspending new communications to the first cloud-based application executor.

6. The method of claim 1, wherein a user communicates with one or more of the first cloud-based application executor and the second cloud-based application executor using a reverse proxy and wherein the reverse proxy sends communications from the user to an active one of the first cloud-based application executor and the second cloud-based application executor.

7. The method of claim 1, wherein the second key is not provided to the first cloud-based application executor.

8. The method of claim 1, wherein one or more of the first cloud-based application executor and the second cloud-based application executor comprise one or more of a virtual machine and a container.

9. The method of claim 1, wherein one or more of the first key and the second key are provided by a trusted container orchestration system from a pool of available keys managed by a resource manager.

10. A system, comprising:
a memory; and
at least one processing device, coupled to the memory, operative to implement the following steps:
determining that a retention time for a first cloud-based application executor has elapsed, wherein the first cloud-based application executor has key-based access to at least one other device using a first key;
in response to the determining, performing the following steps, using at least one processing device:
creating a second cloud-based application executor, wherein the first cloud-based application executor, the second cloud-based application executor and the at least one other device are distinct from one another; and
determining a second key for the second cloud-based application executor that is different than the first key, wherein the second cloud-based application executor provides the first key with the second key to add the second key to one or more trusted keys of the at least one other device such that the second cloud-based application executor has key-based access to the at least one other device using the second key, wherein the first key is deactivated from the one or more trusted keys.

11. The system of claim 10, wherein the first cloud-based application executor comprises a configuration manager that uses the first key to control the at least one other device.

12. The system of claim 10, wherein a user communicates with one or more of the first cloud-based application executor and the second cloud-based application executor using a reverse proxy and wherein the reverse proxy sends communications from the user to an active one of the first cloud-based application executor and the second cloud-based application executor.

13. The system of claim 10, wherein the second key is not provided to the first cloud-based application executor.

14. The system of claim 10, wherein one or more of the first cloud-based application executor and the second cloud-based application executor comprise one or more of a virtual machine and a container.

15. The system of claim 10, wherein one or more of the first key and the second key are provided by a trusted container orchestration system from a pool of available keys managed by a resource manager.

16. A computer program product, comprising a non-transitory machine-readable storage medium having encoded therein executable code of one or more software programs, wherein the one or more software programs when executed by at least one processing device perform the following steps:
determining that a retention time for a first cloud-based application executor has elapsed, wherein the first cloud-based application executor has key-based access to at least one other device using a first key;
in response to the determining, performing the following steps, using at least one processing device:
creating a second cloud-based application executor, wherein the first cloud-based application executor, the second cloud-based application executor and the at least one other device are distinct from one another; and
determining a second key for the second cloud-based application executor that is different than the first key, wherein the second cloud-based application executor provides the first key with the second key to add the second key to one or more trusted keys of the at least one other device such that the second cloud-based application executor has key-based access to the at least one other device using the second key, wherein the first key is deactivated from the one or more trusted keys.

17. The computer program product of claim 16, wherein a user communicates with one or more of the first cloud-based application executor and the second cloud-based application executor using a reverse proxy and wherein the reverse proxy sends communications from the user to an active one of the first cloud-based application executor and the second cloud-based application executor.

18. The computer program product of claim 16, wherein the second key is not provided to the first cloud-based application executor.

19. The computer program product of claim 16, wherein one or more of the first cloud-based application executor and the second cloud-based application executor comprise one or more of a virtual machine and a container.

20. The computer program product of claim 16, wherein one or more of the first key and the second key are provided by a trusted container orchestration system from a pool of available keys managed by a resource manager.

* * * * *